United States Patent [19]

Evans et al.

[11] Patent Number: 5,007,589
[45] Date of Patent: Apr. 16, 1991

[54] PROCESS FOR SIMULTANEOUSLY LEACHING AND FINE MILLING A SUBDIVIDED SOURCE MATERIAL

[75] Inventors: Dennis E. Evans, Rivonia; Keith S. Liddell, Weltevreden Park, both of South Africa

[73] Assignee: Metprotech Limited, Douglas, Isle of Man

[21] Appl. No.: 529,702

[22] Filed: May 30, 1990

Related U.S. Application Data

[63] Continuation of Ser. No. 317,470, Mar. 3, 1989, abandoned, which is a continuation-in-part of Ser. No. 172,650, Mar. 24, 1988, abandoned.

[30] Foreign Application Priority Data

Mar. 26, 1987 [ZA] South Africa .................. 87/2229

[51] Int. Cl.$^5$ .................................................. B02C 17/16
[52] U.S. Cl. ........................................... 241/21; 241/172
[58] Field of Search ................... 241/21, 172, 46.17, 241/30; 423/1, 20, 27, DIG. 15

[56] References Cited

U.S. PATENT DOCUMENTS

| | | | |
|---|---|---|---|
| 3,149,789 | 9/1964 | Szegvari | 241/172 X |
| 4,269,808 | 5/1981 | Kawabata | 423/DIG. 15 X |
| 4,816,234 | 3/1989 | Brison et al. | 423/27 X |

*Primary Examiner*—Mark Rosenbaum
*Attorney, Agent, or Firm*—Mason, Fenwick & Lawrence

[57] ABSTRACT

A source material in the form of an ore, mineral, concentrate, calcine, or reclaimed tailings is subjected to fine milling in a stirred mill having an impeller rotatable in a grinding chamber filled with grinding media. A slurry of the source material is fed, on a continuous basis, to an inlet to the grinding chamber which is generally at a low level and flows through the chamber and out of an outlet, conveniently an overflow type of outlet. The carrier liquid may be a leach solution and/or oxidizing air or oxygen can be fed to the material as it is being milled. Enhanced recoveries of gold using a cyanide leach solution as the carrier liquid can be achieved using the process.

10 Claims, 3 Drawing Sheets

THE EFFECT OF PRODUCT SIZE ON GOLD DISSOLUTION FOR A GOLD BEARING CALCINE.

PROCESS FOR SIMULTANEOUSLY LEACHING AND FINE MILLING A SUBDIVIDED SOURCE MATERIAL

This application is a continuation of application Ser. No. 07/317,470, filed Mar. 3, 1989, now abandoned, which is a continuation-in-part of application Ser. No. 07/172,650, filed Mar. 24, 1988, now abandoned.

FIELD OF THE INVENTION

This invention relates to a leaching process involving the simultaneous fine milling of subdivided source materials to recover a required component of the source material. The objective of carrying out fine milling is generally the recovery of metal values or simply the production of a milled product from a source thereof, which may be in the form of a primary ore or mineral, a concentrate, a calcine, or reclaimed tailings (herein referred to collectively as "the source material") using a fine milling technique whereby the particle size of such "source material" is substantially reduced in order to enhance dissolution of the metal values required in the particles of source material or to render such source material suitable for some other purpose as the production of a sinter or ceramic material.

BACKGROUND TO THE INVENTION

It is well known that dissolution of metal values, in particular gold, from certain types of source materials such as pyrite, arsenopyrite, silica and other refractory types of materials is enhanced by milling the material to smaller particle sizes followed by subsequent leaching using an appropriate leach liquor, in the case of gold, usually a cyanide leach liquor. This is due to the fact that a portion of the metal, particularly gold, which is physically encapsulated is released and made available for leaching. The finer the source material is milled, the more of such metal is released for leaching. Clearly, there comes a point where, due to the cost of milling, it is uneconomical to mill the source material any finer.

In spite of the fact that simultaneous grinding and leaching has been proposed previously (see U.S. Pat. No. 4,269,808 to Kawabata) it has not been possible heretofore to economically treat certain materials, in particular certain precious metals containing materials, by grinding them to sizes substantially finer than $7.9 \times 10^{-4}$ inches (20μm). This is evidenced by the large amounts of material worldwide that have been discarded from conventional treatment plants and that could form economically viable feedstock if a suitable recovery process could be found.

It has now surprisingly been found that if milling and simultaneous leaching is effected under certain conditions, enhanced results are achieved.

SUMMARY OF THE INVENTION

In accordance with this invention there is provided a process for the leaching during simultaneous fine milling of a sub-divided source material (as herein defined) wherein the source material is fed, as a slurry, substantially continuously, together with a leach solution, to a first region of a stirred mill having an impeller with outwardly extending stirring arms each of which has a tip at its free end with said impeller rotating in a grinding chamber containing grinding media composed of a multitude of media particles, and withdrawing finely milled source material together with leach solution in a second region of the stirred mill spaced from the first region, the stirred mill being operated at a power density (being the power input in kilowatts per cubic meter of grinding media) of at least 0.508 hp/gal (100 kW/m$^3$), at a minimum impeller speed chosen to produce a product or multiple of the arm tip speed and the individual mean media particle mass (such product being referred to herein as the media particle momentum) of at least $1.61 \times 10^{-3}$ oz ft/s (0,15 gram-meters per second), Further features of the invention provide for the carrier liquid to embody any required oxidizing medium for assisting in leaching or oxidizing metal values and other constituents in the source material; for the grinding media particles to be spherical, cylindrical, polygonal or irregular shaped elements made either of steel or ceramic, in particular zirconia materials; for oxygen or other gases required for oxidizing or leaching to be introduced together with leach liquor at the first region of the stirred mill; and for the metal to be recovered to include gold and for the leach solution to be a cyanide leach liquor.

The impeller may be rotatable either about a vertical or a horizontal axis and, in either case, the leach solution and subdivided source material are preferably introduced in a lower region and withdrawn from an upper region. This upflow counteracts the tendency of the solids to sink to the lower region.

Preferably the process is carried out such that the particle size of the source material is reduced to 90% less than $7.87 \times 10^{-4}$ inches (20μm), preferably 100% less than $7.87 \times 10^{-4}$ inches (20μm) and most preferably 90% less than ($1.97 \times 10^{-4}$ inches (5μm) up to $3.94 \times 10^{-4}$ inches (10μm). Clearly a large proportion of particles will have considerably smaller sizes and applicants believe that particle sizes of $1.18 \times 10^{-4}$ inches (3μm) or less may be achieved.

The flowrate of the leach solution will clearly be chosen to provide a desired residence time of the subdivided source material within the mill in order to achieve a required leaching of the metal values.

The fineness of both source materials and products will, hereinafter, be discussed with reference to the term $d_x$ where x is the percentage of the particles of the material which are smaller than a stated size. Thus a rating of $d_{50} = 7.87 \times 10^{-4}$ inches (20μm) means that 50% of the mass of the sample have a particle size of $7.87 \times 10^{-4}$ inches (20μm) or less and a rating of $d_{90} = 7.87 \times 10^{-4}$ inches (20μm) means that 90% of the mass of the sample have a particle size of $7.87 \times 10^{-4}$ inches (20μm) or less.

It is envisaged that the process of this invention will be particularly suitable for the recovery of gold from highly refractory ores and concentrates as well as from tailings from earlier extraction processes.

The invention can also be advantageously applied to processes wherein the material being milled is simultaneously subjected to the action of other chemicals, in particular oxidants during the milling process. One such application is to gold bearing pyrite, pyrrhotite or marcasite concentrates where milling releases iron and sulphur into solution. This would consume cyanide and, accordingly, the material is simultaneously oxidized, conveniently by the action of air or oxygen at the alkaline pH of the cyanide solution.

It is believed that the advantageous effects of the invention are achieved in consequence of rapidly changing the torsional and compressive stresses that act upon the particles of source material whilst they are resident in the mill and in this way the particles are fractured rather than broken. The fractures range in size from large permanent fractures to small transient fractures which disappear when the stresses applied by the media are removed. This phenomenon is called the "Rehbinder Effect". The fact that the intraparticle fractures are within a state of flux while the particle is resident in the mill has an advantageous effect on the rate of leaching and the overall recovery of the precious or other metals, because, as the fractures open and close, there is the effect of "pumping" the lixiviant into and out of the particle, thus enabling the metal particles still trapped within the host particles to be dissolved.

For the abovementioned effect to occur, the installed power density horsepower per gallon (Kw per cubic meter of chamber volume) has to be above the threshold level indicated above.

Thus the liberation of the metals from the host particle by the process is by a combination of size reduction and permanent and transient fracturing whilst the material is resident in the energy field of the mill.

The invention and some embodiments thereof will now be further described with reference to the accompanying drawings.

DETAILED DESCRIPTION WITH REFERENCE TO THE DRAWINGS

Figure 1:
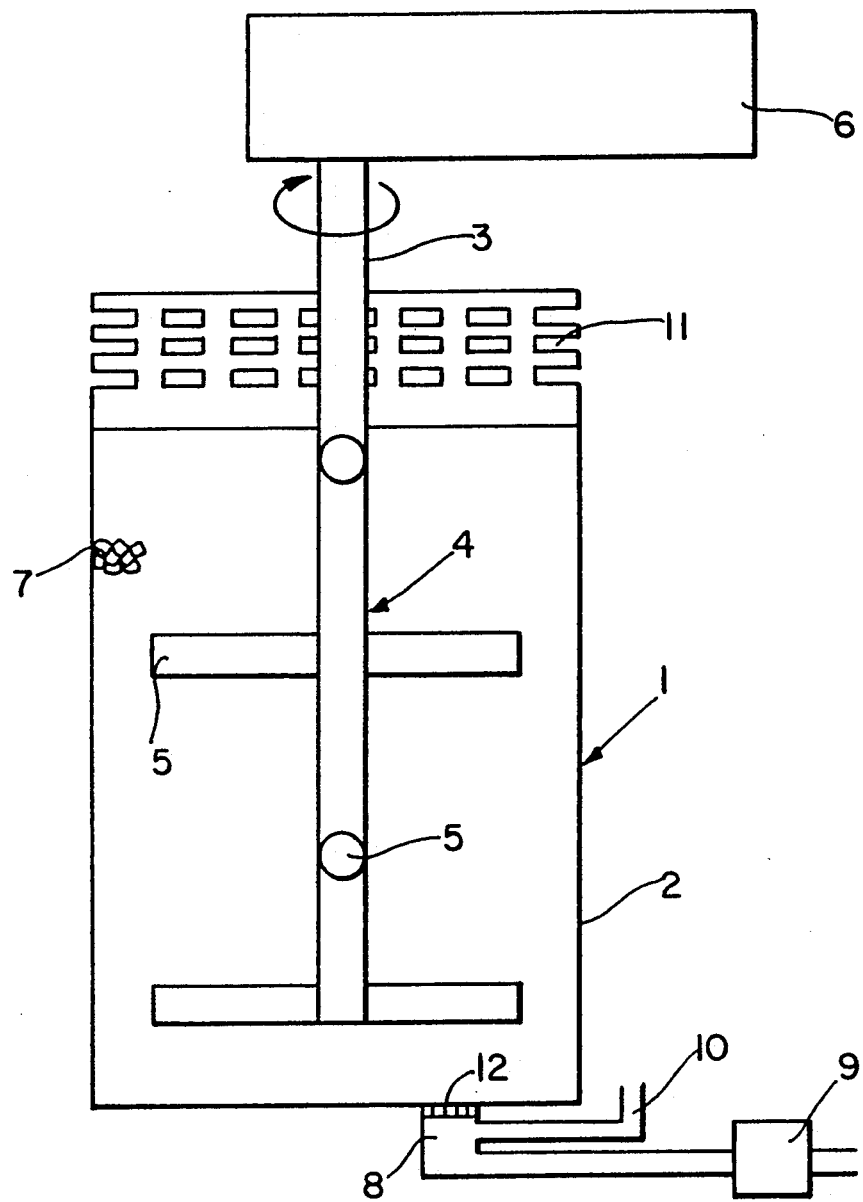
FIG. 1 is a schematic illustration of a stirred mill to be employed according to the invention.

As illustrated in FIG. 1 a stirred mill 1 comprises a grinding chamber 2 in which a substantially vertical shaft 3 of an impeller 4 having a series of outwardly directed stirring arms 5 is rotatable by means of a motor and gearbox 6. The grinding chamber is filled with grinding media 7 which may assume the form of spheres, cylinders, polygonal shapes or irregular shaped steel or ceramic grinding elements. In tests carried out to date both steel and ceramic (zirconia) grinding balls (spheres) have been employed.

A slurry inlet 8 is provided at the bottom of the grinding chamber either in the bottom or in the sidewall thereof, the inlet being fed from a feed pump 9 with slurry, in use. If required a gas inlet 10 can be provided for example for oxygen, air or any other gas to assist in the dissolution process or assist in the reduction of the consumption of cyanide, or both.

The upper end wall of the grinding chamber is provided with a retaining screen 11 extending therearound for retaining the grinding media whilst allowing the milled slurry to leave the grinding chamber simply as an overflow. A holding screen 12 is provided across the inlet to retain the grinding media.

In tests carried out on a pilot scale grinding mill, the grinding chamber volume was 39.6 gallons (150 liters), the chamber being 1.48 ft (450 mm) in diameter and 2.95 ft (900 mm) high. The holding screen 12 was provided with 0.08 inches (2 mm) holes and the retaining screen 11 had slots of 0.05 inches (1.2 mm)×0.79 inches (20 mm) in size. The grinding media was steel balls (although some batch tests were carried out using zirconia balls) having a Rockwell hardness of 58C and a size distribution of:

| 89% | <0.33 inches (8.5 mm) diameter |
| 9% | <0.16 inches (3.97 mm) diameter |
| 2% | <0.09 inches (2.38 mm) diameter |

There were fifteen pairs of arms of 1.31 ft (400 mm) length offset angularly by 90° relative to adjacent arms. Rotation was effected at a speed giving a tip speed of 8.53 ft/s (2.6 m/s). The momentum of the grinding media particles was $2.81 \times 10^{-2}$ oz ft/s (2.6 gm/sec). The power density employed was 0.864 hp/gal (170 Kw/m$^3$) and the density difference between the media and slurry was 53.8 lb/gal (6.45 Kg/liter). The mill contained 1096 lb (497 Kg) of balls having a bulk volume of 31.7 gal. (120 liters) giving a net void volume of 12.9 gal. (49 liters).

Figure 2:
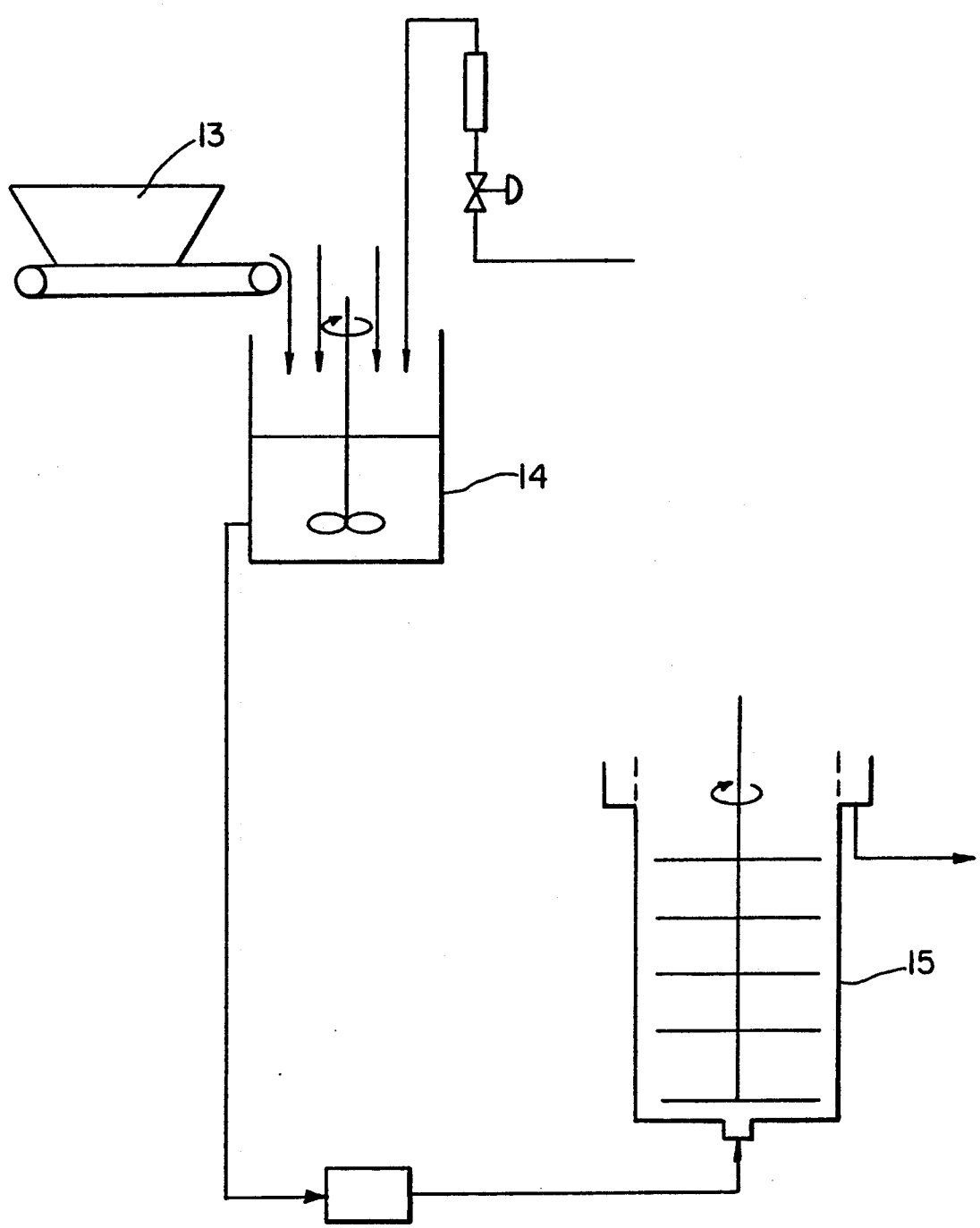
FIG. 2 is a schematic flow sheet of a pilot mill assembly used for test purposes; and, FIG. 3 is a graph showing the comparative results obtained with three different mill operating conditions.

For the tests carried out on certain gold bearing source materials, cyanide leach solution was used and Ca(OH)$_2$ was used to maintain an adequately high pH. For these tests the arrangement of FIG. 2 was employed wherein calcine (which had previously been leached with cyanide i.e. there was no freely leachable gold remaining) was fed from a hopper to a mixing vessel 14 and sodium cyanide, lime and water were simultaneously added. The slurry which had a solids content of 50% by mass was continuously fed to the stirred mill 15 described above. Residence times of 15.7; 9.0 and 6.3 minutes were tested. The operating conditions were as follows:

| Residence time, nominal, minutes | Solids Kg/min (lb/min) | Water l/min (gal/min) | Pulp l/min (gal/min) | pH | NaCN add Kg/t (lb/t) |
| --- | --- | --- | --- | --- | --- |
| 15.7 | 2.41 (5.31) | 2.41 (0.64) | 3.12 (0.82) | 11.0 | 5 (11.0) |
| 9.0 | 4.23 (9.32) | 4.33 (1.14) | 5.45 (1.44) | 11.0 | 5 (11.0) |
| 6.3 | 6.04 (13.31) | 6.04 (1.60) | 7.78 (2.05) | 11.0 | 5 (11.0) |

The leaching was continued for 24 hours after dilution of the milled product to 35% by mass solids.

The Tests showed that from a calcine having a d$_{90}$, d$_{50}$, and d$_{10}$ of $3 \times 10^{-3}{}'$ (76.0); $8.2 \times 10^{-4}{}'$ (20.8) and $2.3 \times 10^{-4}{}'$ (5.9 μm) respectively, the products had the size distributions shown in the following table:

| Nominal res. time mins. | Size distribution | | | Gold dissolution in mill % | Gold dissolution after mill + 24 hr leach |
| --- | --- | --- | --- | --- | --- |
| | d$_{90}$ | d$_{50}$ | d$_{10}$ | | |
| | (inches × 10$^{-4}$) μm | | | | |
| 15.7 | 9.0 (3.5) | 3.2 (1.3) | 0.8 (0.31) | 47.2 | 50.0 |
| 9.0 | 15.1 (5.9) | 4.4 (1.7) | 0.9 (0.35) | 36.7 | 40.0 |
| 6.3 | 19.4 (7.6) | 5.3 (2.1) | 1.0 (0.39) | 28.4 | 32.5 |

It will be seen that gold dissolution increases with residence time as would be expected. Also, good recoveries are made from a source material generally regarded as highly refractory, by far the vast majority of dissolution taking place within the mill in the relatively very short period of time for which the slurry was present in the mill.

The invention can be similarly used to fine mill existing dumps of treated ore and concentrates/products from treatment of such dumps to recover further values therein. In so doing about 50% of the residual gold has been recovered.

In the case of a coarse calcine, 73% of the gold therein was recovered by leaching during the grinding process.

In general, as indicated above, the particle size of the product is at least 95% less than $7.9 \times 10^{-4}$ inches (20μm) with, as usual, a large proportion of the particles having a substantially smaller size.

It has also been found that increased dissolutions are achieved when zirconia balls replace the steel balls described above. Zirconia balls have further advantages in that they do not consume cyanide (in the case of gold leaching) and are substantially more wear resistant than steel.

Simply as a comparative exercise, three different tests were conducted, the results of these showing the most significant advantages of the invention.

The tests are, in this description, labelled as Tests A, B and C.

Figure 3:
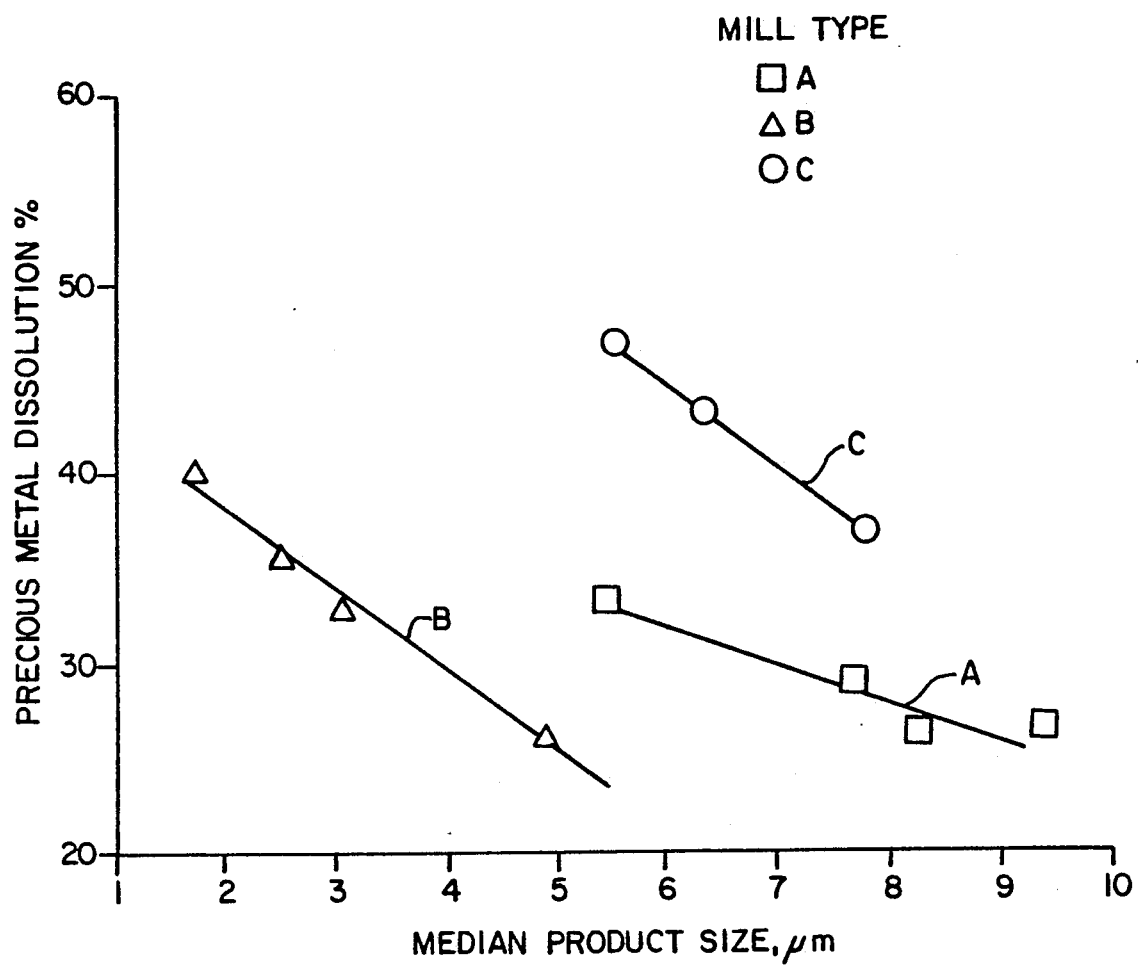

Test A was carried out on a vibrating type of mill in which the grinding media was alumina balls having a mean diameter of 0.5 inches (12.5 mm). This mill was operated at a power density of 0.064 hp/gal (20 kW/m$^3$) and the median particle mass was 0.18 ozs. (5.22 grams) (in this case the impeller tip speed is irrelevant as no impeller is present). The dissolutions obtained at four different residence times, at which four different media product sizes were obtained, are illustrated by Graph "A" in FIG. 3. It will be noted that a maximum dissolution which was under 35% was obtained at a median product size of somewhat over $1.97 \times 10^{-4}$ inches (5μm). The difference in density of the grinding media and the slurry was, in this case 13.8 lb/gal. (1.65 Kg/l).

In Test B a stirred mill was employed using a grinding media of alumina balls having a mean diameter of about 0.05 inches (1.3 mm). The impeller tip speed was, in this case, 38.5 ft/sec (11.73 m/s) and the media particle mass $1.4 \times 10^{-4}$ oz. (0.004 g), thus giving a media particle momentum of $8.1 \times 10^{-5}$ oz.ft/s (0.05 gm/s). The results of this test are shown by Graph "B" in FIG. 3 from which it will be noted that, in spite of the fact that a power density of 4.26 hp/gal (838 kW/m$^3$) was used, very poor dissolutions were obtained in view of the extremely small median product size of between $3.9 \times 10^{-5}$ inches (1μm) and $7.8 \times 10^{-5}$ inches (2μm) that were achieved in the one case. In spite of such a small product size, only 40% dissolution was achieved. In this case the difference in density between the grinding media and the slurry was 13.8 lb/gal (1.65 Kg/l).

In contradistinction, Test C was carried out using steel balls of an average diameter of 0.12 inches (3.0 mm) and at a power density of 0.579 hp/gal (114 kW/m$^3$). In this case the impeller tip speed was 7.22 ft/s (2.2 m/s) and the media particle mass was $3.88 \times 10^{-3}$ oz (0.11 grams) thus giving a media particle momentum of $3.87 \times 10^{-4}$ oz.ft/s (0.24 gm/s). The density of the grinding medium was greater than that of the slurry by 53.8 lb/gal (6.45 Kg/l). In this case the dissolutions achieved were extremely satisfactory as shown by Graph "C" in FIG. 3.

Additional tests carried out in the same manner as Test C, except for the fact that the power density was changed, gave a precious metal dissolution of only 14% at a median product size of $7.48 \times 10^{-5}$ inches (1.9μm) and power density of 0.467 hp/gal (92 kW/m$^3$); a precious metal dissolution of 44% at a median product size of $7.48 \times 10^{-5}$ inches (1.9μm) but a power density of 0.751 hp/gal (148 kW/m$^3$) and 51% dissolution at a median product size of $6.30 \times 10^{-5}$ (1.6μm) and a power density of 1.105 hp/gal (200 kW/m$^3$). This illustrates the distinct advantage achieved by employing a satisfactory power density coupled with the other stated constraints.

It is to be understood that the optimum conditions for any particular sub-divided source material may well vary quite widely and, accordingly, it is for individual requirements to be assessed through tests carried out within the scope for which applicant seeks protection.

The invention therefore provides a simple yet effective process for enhancing the recovery of metal values from source materials and, in particular, of gold from pyrite and other materials from which it is generally difficult to liberate.

We claim:

1. A process for simultaneously leaching and fine milling a sub-divided source material which comprises the steps of feeding said source material substantially continuously as a slurry in a leach solution, to the grinding chamber of a stirred mill having a rotatably driven impact impeller with outwardly extending stirring arms each of which has a tip at its free end, said grinding chamber containing particulate grinding media, subjecting said source material to fine milling within said grinding chamber, and withdrawing finely milled source material from said grinding chamber together with leach solution wherein said impeller is driven at a power density in kilowatts of power input per cubic meter of grinding media of at leas 100 kW/m$^3$, and at an impeller speed imparting to the media particles a momentum defined by the multiple of the arm tip speed and the individual mean media particle mass of at least 0.15 gram-meters per second, and the difference between the density of the grinding media and density of said slurry of source material is at least 1 Kg/liter.

2. A process as claimed in claim 1 in which the source material contains gold.

3. A process as claimed in claim 2 in which the leaching solution is a cyanide solution and an alkali is added to maintain a suitably high pH to the solution.

4. A process as claimed in claim 1 in which the impeller is rotatably about a vertical axis; and said slurry is fed via an inlet in a lower region of said grinding chamber and withdrawn via an outlet in an upper region thereof.

5. A process as claimed in claim 4 in which the outlet is an overflow type of outlet.

6. A process as claimed in claim 1 in which the grinding media is selected from steel and zirconia balls.

7. A process as claimed in claim 1 in which the residence time of the source material in the grinding chamber is chosen such that the final milled material has a d$_{90}$ of less than $7.87 \times 10^{-4}$ inches (20μm).

8. A process as claimed in claim 7 in which the final milled material has a d$_{90}$ of from $1.97 \times 10^{-4}$ inches (5μm) to $3.94 \times 10^{-4}$ inches (10μm).

9. A process as claimed in claim 7 in which the final milled material has a d$_{100}$ of less than $7.87 \times 10^{-4}$ (20μm).

10. A process as claimed in claim 1 in which the source material contains an oxidizable element selected from sulphur and iron, and air and an oxidizing gas selected from oxygen and air is added to oxidize such element.

* * * * *